United States Patent [19]
Saita

[11] 3,779,219

[45] Dec. 18, 1973

[54] DEVICE FOR CONTROLLING IGNITION TIMING OF ENGINE

[75] Inventor: Toshikazu Saita, Himeji, Japan

[73] Assignee: Mitsubishi Denki Kabushiki Kaisha, Tokyo, Japan

[22] Filed: Feb. 1, 1971

[21] Appl. No.: 111,425

[30] Foreign Application Priority Data
Feb. 4, 1970 Japan.............................. 45/11408
Feb. 10, 1970 Japan.............................. 45/13391

[52] U.S. Cl........................... 123/117 R, 123/148 E
[51] Int. Cl................................................ F02p 5/04
[58] Field of Search............... 123/117, 117.1, 148 E

[56] References Cited
UNITED STATES PATENTS

| 3,647,016 | 3/1972 | Fitzsimons | 180/105 |
|---|---|---|---|
| 3,665,904 | 5/1972 | Goodwillie | 123/117 |
| 3,561,410 | 2/1971 | Soeters | 123/117 |
| 3,426,737 | 2/1969 | Walker | 123/117 |
| 3,547,088 | 12/1970 | Yagi | 123/117 |
| 3,277,875 | 10/1966 | Miki | 123/117 |
| 3,272,191 | 9/1966 | Walker | 123/117 |
| 3,593,693 | 7/1971 | Dietrich | 123/117 |

Primary Examiner—Laurence M. Goodridge
Assistant Examiner—Ronald B. Cox
Attorney—Robert E. Burns and Emmanuel J. Lobato

[57] ABSTRACT

A switching transistor is placed in its conducting mode when a sensor switch senses certain operating conditions of an engine such as the idling in which the ignition timing should lag and, is placed in its nonconducting mode when a separate sensor switch senses operating conditions of the engine such as the starting in which the ignition timing is normal. When conducting, the transistor operates a relay to enable one contact set to generate an ignition voltage across an ignition coil at a time later than the normal ignition timing. When nonconducting, the transistor maintains the relay in its normal position to enable another contact set to generate an ignition voltage across the coil at the normal ignition timing. Alternatively, the contact sets each may be open to render another conducting transistor nonconducting to interrupt a primary ignition coil.

14 Claims, 2 Drawing Figures

DEVICE FOR CONTROLLING IGNITION TIMING OF ENGINE

BACKGROUND OF THE INVENTION

This invention relates to a device for controlling the ignition timing of an internal conbustion engine.

Heretofore, in order to decrease amounts of poisonous hydrocarbons and carbon monoxide contained in the exhaust gas from motor vehicles, for example during the idle running of the associated internal conbustion engines, it has been commonly practiced to lag the ignition timing behind the normal ignition timing during the idle running of the engines by various methods. For example, a status sensor switch or the like has been operatively coupled to an acceleration pedal on the motor vehicle to sense the idle running mode of the engine. The switch has responded to the idle running mode of the engine sensed thereby to operate a lagging ignition circuit involved directly or through relay means.

However if the ignition timing lags at the start of the engine, it is difficult to start the engine. Therefore another status sensor switch has been used to respond to the operation of the associated starter to sense the start of the engine. If that switch has sensed the start of the engine then it has been operated to disenable the lagging ignition circuit directly or through relay means thereby to control the ignition timing so as to develop ignition sparks at the normal ignition timing.

Further, in order to decrease amounts of nitrogen oxides contained in the exhaust gas, the ignition timing has been caused to lag behind the normal one at that position of a transmission gearing involved where the nitrogen oxides are formed in large amounts. To this end a status sensor switch responsive to such a position of the transmission gearing has been used to sense that position of the gearing to operate the lagging ignition circuit directly or through relay means thereby to control the ignition timing.

Although the measures as above described have been used to control the ignition timing thereby to reduce the amounts of poisonous gases exhausted from the engines, the primary circuit for the ignition coil has formed an electric circuit for controlling the ignition timing through the status sensor switch with or without the relay means. Therefore, each time the ignition timing is controlled, electric contacts of the particular status sensor switches and/or relay means have been required to interrupt a high current flowing through the associated inductance circuit. This has led to arcing across the contacts which causes the contacts to be much worn away to decrease the useful life thereof. Further many of the control elements have been disposed as above described and accordingly the number of the status sensor switches and/or relays is increased. Thus, in order to maintain the reliability of the system, the status switches and/or relays have been required to be very high in reliability.

In addition, the control elements are scattered on the motor vehicle so that the electric circuitry through which high currents flow has necessarily extended a long distance. Therefore, the supply voltage has dropped along the electric circuitry to such an extent that the voltage drops come into question while the circuitry becomes defective in that it will act as an antenna for radiating the noise wave.

Moreover with the relays used, they should be housed in casings respectively for the purpose of rendering the relays water-proof and dust-proof. When a large number of relays are used, a multiplicity of the casings must also be used. This has resulted in a great increase in mounting area while at the same time requiring much labor for mounting the casings.

SUMMARY OF THE INVENTION

Accordingly it is an object of the invention to provide a new and improved device for controlling the ignition timing of an internal combustion engine to substantially eliminate or minimize poisonous gases contained in the exhaust gas from the engine and in which the above-mentioned disadvantages are eliminated.

The invention accomplishes this object by the provision of a device for controlling the ignition timing of an internal combustion engine comprising a plurality of status sensor elements operatively associated with the engine to sense predetermined operating statuses of the engine to produce status signals, an ignition circuit for an ignition coil for controlling the ignition timing of the engine in response to the status signals, and a source of electrical energy for energizing of the status sensor elements and the ignition circuit, characterized in that there is provided a control circuit for connecting the status sensor elements in parallel to circuit relationship to the source and including a single semiconductor switching element common to all the status sensor elements for forming the same control signal in response to each of the status signals, and the ignition circuit responds to the same control signal to control the conduction of the ignition coil thereby to control the ignition timing of the engine.

In at least one of the status sensor elements may pass its own status signal therethrough to prevent it from being applied to the semiconductor switching element at its operated position while permitting the status signal to be applied to the semiconductor switching element at its in operative position.

Advantageously, predetermined ones of the status sensor elements each may have a semiconductor diode branched from an energizing circuit therefor and disposed in a circuit for energizing the semiconductor switching circuit and in the forward direction with respect thereto.

BRIEF DESCRIPTION OF THE DRAWING

The invention will become more readily apparent from the following detailed description taken in conjunction with the accompanying drawing in which.

DESCRIPTION OF THE PREFERRED EMBODIMENTS

Figure 1:
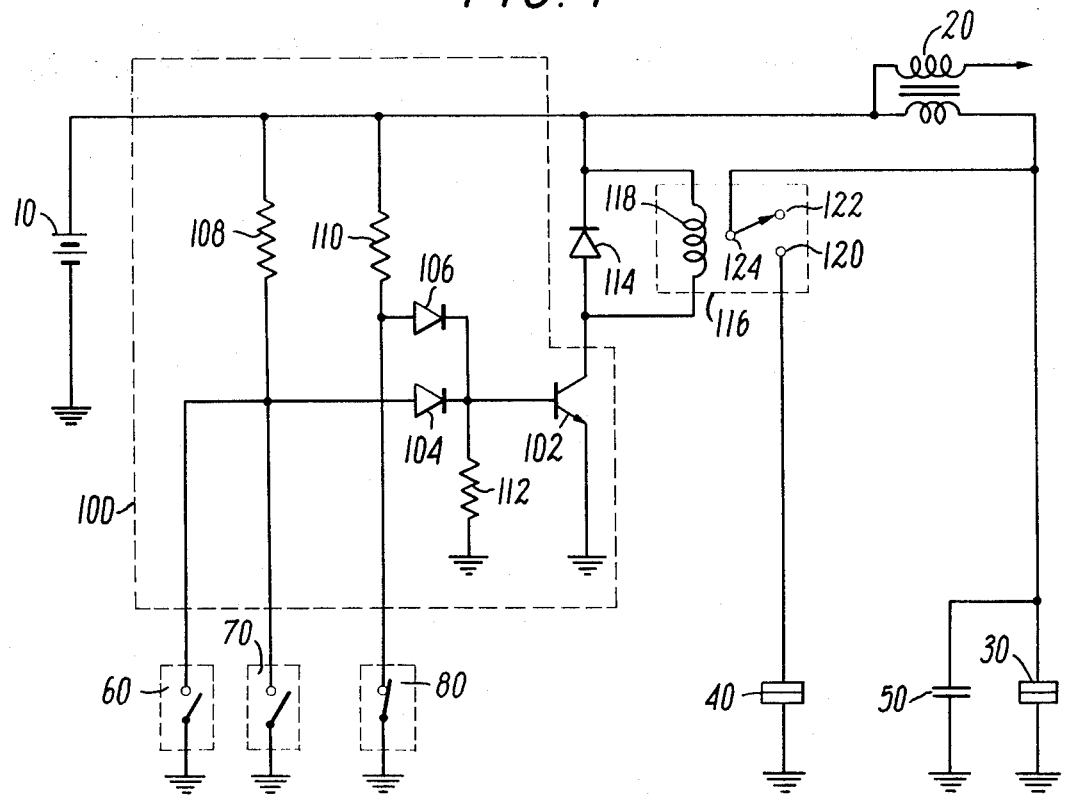
FIG. 1 is a schematic circuit diagram of a device for controlling the ignition timing of an internal combustion engine in accordance with the principles of the invention.

Referring now to the drawing and FIG. 1 in particular, it is seen that an arrangement disclosed herein comprises a source of direct current 10 such as a battery equipped on a motor vehicle (not shown) having a negative terminal connected to ground, for example, a chassis for the vehicle (not shown), and an ignition coil 20 connected to the positive terminal of the source 10 to generate an ignition voltage in the well known manner. The primary winding of the ignition coil 20 is then connected to ground through a set of contacts 30 of a contact breaker and another set of contacts 40 of a contact breaker is connected between the primary ignition winding and ground in the manner as will be described hereinafter. The set of contacts 30 is responsive to the rotation of an internal combustion engine to be alternately opened and closed only at the normal ignition timing cycle of the engine and has connected thereacross a capacitor 50 for preventing an electric arc from occurring across the contacts 30 during opening and closing of the latter. Similarly the set of contacts 40 is responsive to the rotation of the engine to be alternately opened and closed only at a time point later than the normal ignition timing cycle of the engine. The secondary winding of the ignition coil 20 is connected to spark plugs (not shown) in the well known manner. The ignition timing cycle developed by the set of contacts 30 defines one timing mode of energization of the ignition coil 20 and the timing cycle developed by the set of contacts 40 defines a different timing mode of energization of the ignition coil.

The arrangement further comprises sensing means including a plurality of status sensor elements 60, 70 and 80 operatively associated with the engine to sense operating conditions or statuses thereof. The sensor elements are preferably normally open or closed switches as shown in FIG. 1 for sensing predetermined statuses of the engine to be put in their ON or OFF position. More specifically, the normally open switch 60 is operatively coupled to an acceleration pedal (not shown) to be closed upon treading the pedal and may be called an acceleration sensor switch. The normally open switch 70 is operatively coupled to a starter switch (not shown) to be closed upon starting the engine and may be called a start sensor switch. The normally closed switch 80 is operatively coupled to a transmission gearing (not shown) and may be called a position-of-transmission gearing sensor switch. In this example, the switch 80 is adapted to respond to the second operating position of the transmission gearing to be open. While the three sensor switches are illustrated in FIG. 1, it is to be understood that the number of the switches may be different from that illustrated.

As shown in FIG. 1, the switches 60, 70 and 80 are connected at one end to ground and at the other end to the positive terminal of the source 10 through a single control circuit generally designated by the reference numeral 100. The control circuit 100 includes a single switching transistor 102 common to all the status sensor elements. The transistor 102 includes an input side having a base electrode connected to cathode electrodes of two semiconductor diodes 104 and 106. The diodes 104 and 106 include anode electrodes connected to sensor sensor the junction of the sensor switches 60 and 70 and to the sensor switch 80 respectively. The anode electrodes of the diodes 104 and 106 are connected to the positive terminal of the source 10 through resistors 108 and 110 respectively. Thus the diodes 104 and 106 are disposed in a circuit for energizing the transistor 102 and in the forward direction with respect to that circuit. The transistor 102 has a base resistor 112 connected across the base electrode and ground, and an output side having an emitter electrode connected to ground and a collector electrode connected to the positive terminal of the source 10 through a semiconductor diode 114.

The diode 114 has connected thereacross a relay generally designated by the reference numeral 116. More specifically the relay 116 includes an operating winding 118 connected across the diode 114, a pair of stationary contacts 120 and 122 and a movable contact 122 normally engaging the stationary contact 122. The diode 114 is so poled as to block a counter electromotive force developed across the operating winding 118. The movable contact 124 is connected to the junction of the primary winding of the ignition coil 20 and the set of contacts 30 while the stationary contact 120 is connected to the set of the contacts 40. Thus it will be appreciated that the relay 116, the breaker contacts 30 and the breaker contacts 40 form an ignition circuit for the coil 20.

Assuming that the engine (not shown) is in the idle running, the acceleration and start sensor switches 60 and 70 are in their OFF position while the position-of-gearing sensor switch 80 is in its ON position. Under these circumstances, an electric signal comprising a base current is supplied from the source 10 through the resistor 108 and the diode 104 to the base electrode of the transistor 102 switch same from its nonconducting state to its conducting state. The conduction of the transistor 102 permits a current to flow from the source 10 through the operating relay winding 118 to put the relay in its enerzgized state. Therefore the movable contact 124 is transferred from the contact 122 to the contact 120 to cause the contacts 40 to be connected to the ignition coil 20.

Therefore, the current flowing through the primary winding of the ignition coil 20 is not interrupted by the opening of the contacts 30 effected at the normal ignition timing because the contacts 40 are; in their closed position. However the contacts 40 are opened later than the normal ignition timing while the contacts 30 are still in their open position. Therefore the opening of the contacts 40 interrupts the current to generate ignition voltages across the ignition coil 20. In this way, the engine is ignited later than the normal ignition timing with the result that poisonous gases contained in the exhaust gas decreases in amounts.

Upon starting the engine, a starter switch (not shown) is manually operated to rotate the associated starting motor (not shown). At the same time, the start sensor switch 70 is put in its ON position to permit a current to flow from the source 10 through the resistor 108 into the now closed switch 70. This current does not provide a base current for the transistor 102 and therefore the latter is maintained in its nonconducting state. Therefore the movable relay contact 124 remains engaged by the stationary contact 122 as shown in FIG. 1. Under these circumstances, the engine is ignited through the opening of the contacts 30 effected at the normal ignition timing with the result that the engine can be easily started.

Then if the transmission gearing (not shown) is put in its second position during the operation of the engine (not shown) thereby to form poisonous nitrogen oxides in large amounts then the position-of-gearing sensor switch 80 is put in its OFF position. Under these circumstances, a current from the source 10 flows through the resistor 110 and the diode 106 to supply a base current to the transistor 102. Therefore the transistor 102 is in its conducting state to repeat the process as above described in conjunction with the idle running of engine, with the result that the engine is ignited later than the normal ignition timing to prevent the formation of the nitrogen oxides at the second position of the transmission gearing leading to decreases in amounts of poisonous gases contained in the exhaust gas.

From the foregoing it will be appreciated that the switching transistor 102 responds to each of status signals produced by the respective status sensor switches to generate the same control signal for controlling the relay.

While the invention has been described in terms of the ignition circuit including the relay 116 it is to be understood that the invention is equally applicable to electronic ignition circuits including semiconductor devices instead of the relay as above described.

Figure 2:
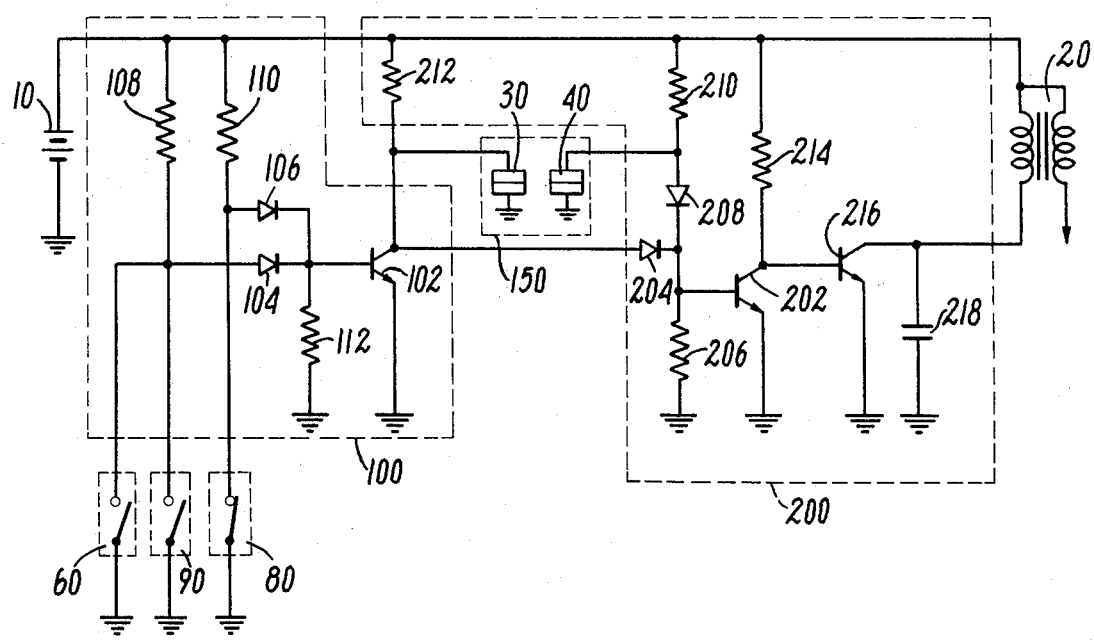
FIG. 2 is a diagram similar to FIG. 1 but illustrating a modification of the invention.

Referring now to FIG. 2 wherein like reference numerals designate the components identical or corresponding to those shown in FIG. 1, there is illustrated a modification of the invention applied to an electronic ignition circuit. The arrangement illustrated includes a negative pressure sensor element or switch 90 rather than the start sensor switch 70 only for the purpose of illustrating another example of status sensor elements. The negative pressure sensor switch 90 is adapted to be closed when a negative pressure within a suction pipe to an engine (not shown) becomes very high during the deceleration of the engine and be open when such a negative pressure is low during the idling, acceleration, constant speed, operations of the engine, and the like.

As illustrated in FIG. 2, the switching transistor 102 is connected at the collector electrode to a transistorized ignition circuit generally designated by the reference numeral 200. The ignition circuit 200 comprises a switching transistor 202 including a base electrode connected to the collector electrode of the transistor 102 through a semiconductor diode 204 poled to permit a base current from the source 10 to be supplied to the transistor 202 therethrough. The base electrode of the transistor 202 is connected to ground through a base resistor 206 and also to the positive terminal of the source 10 through a series combination of semiconductor diode 208 and resistor 210. The diode 208 is poled to permit a base current from the source 10 to be applied to the transistor 202 and has an anode electrode connected to ground through the set of breaker contacts 40 disposed in a housing schematically designated at dotted block 150. The housing 150 further has disposed therein the set of breaker contacts 30 connected across the collector electrode of the transistor 102 and ground and also to the positive terminal of the source 10 through a resistor 212.

The transistor 202 includes an emitter electrode connected to ground and a collector electrode connected to the positive terminal of the source 10 through a resistor 214. The transistor 202 is further connected at the collector electrode to a base electrode of another switching transistor 216 including an emitter electrode connected to ground and a collector electrode connected to the positive terminal of the source 10 through the primary winding of the ignition coil 20. A capacitor 218 is connected across the collector electrode of the transistor 216 and ground. The transistors 202 and 216 are operative such that one of them is in an ON state while the other is in an OFF state.

In other respects the arrangement is identical to that shown in FIG. 1.

During the idle running of the engine, the switching transistor 102 is put in conducting state as above described in conjunction with FIG. 1. Under these circumstances, the opening of the contacts 30 effected at the normal ignition timing does not lead to the generation of an ignition signal because the transistor 202 is in conducting state. However if the contacts 40 are open later than the normal ignition timing then a current flowing from the source 10 through the resistor 210 is supplied, as a base current, to the transistor 202. That is, an ignition signal is supplied to the transistor 202. This causes the transistor 202 to be conducting whereupon a base current flowing through the resistor 214 into the transistor 216 by passes the latter to flow through the now conducting transistor 202. Therefore the transistor 216 becomes nonconducting to interrupt a primary current flowing through the ignition coil 20 leading to the generation of an ignition voltage across the secondary of the coil. It is noted that this ignition voltage results from the opening of the contacts 40 effected later than the normal ignition timing.

With the motor vehicle (not shown) running, its acceleration pedal (not shown) is in its treaded position to maintain the transistor 102 nonconducting as above described in conjunction with FIG. 1. Under these circumstances, the opening of the contacts 30 effected at the normal ignition timing permits a current flowing through the resistor 212 to be applied as a base current to the transistor 202 to put it in the conducting state. Then the process as above described in conjunction with the idle running of engine is repeated until an ignition voltage is generated across the ignition coil 20 at the normal ignition timing.

In that case, the contacts 40 are opened after the contacts 30 have been opened. This causes another base current to be supplied to the transistor 202 but such a current only overlaps the initial base current due to the opening of the contacts 30, so that it does not affect the operation of the system.

If the vehicle is to be decelerated, the acceleration pedal (not shown) can be released to put the acceleration sensor switch 60 in its OFF position. However the negative pressure switch 90 is put in its ON position as above described. The process as above described in conjunction with the running of the vehicle is repeated to generate ignition voltages across the ignition coil 20 at the normal ignition timings.

If the transmission gearing (not shown) is in its second position then the position-of-gearing sensor switch 80 is put in its OFF position whereby a current flowing through the resistor 110 is supplied as a base current to the transistor 102 as above described in conjunction with FIG. 1 and regardless of the switches 60 and 100. Therefore the transistor 102 is conducting to repeat the process as above described in conjunction with the idle running of engine with the result that ignition voltages are developed across the ignition coil 20 at time points later than the normal ignition timings.

In summary, the invention comprises a plurality of status sensor elements operatively associated with different portions of an internal combustion engine to sense predetermined operating statuses of the engine, a semiconductor switching element disposed in common to the status sensor elements to be put in conducting or nonconducting state in accordance with the status of the engine sensed by each of the sensor elements thereby to produce ignition signals in ignition timing from each other, and an ignition circuit responsive to such ignition signals to vary the ignition timing in accordance with the status of the engine thereby to cause an ignition voltage to be generated at the adjusted or varied ignition timing. Accordingly poisonous gases exhausted from the engine are decreased in amounts.

The invention is particularly advantageous in that a single ignition circuit can be used regardless of the number of status sensor elements thereby to increase the reliability of the system. Previously the reliability has been greatly affected by the ignition circuitry. Also the wiring to the ignition circuit is short and simply made resulting in no fear that the wiring causes voltage drops thereacross and in a decrease in fear that the wiring is erroneously made. Further, status sensors high in reliability can be extremely easily provided because those circuits including the individual sensor elements are formed of resistance circuits free from inductances and are not required to have high currents flowing therethrough. In addition, with the ignition circuit small in dimension and including no electric contacts other than the breaker's contacts, such as shown in FIG. 2, the invention is high in reliability and effective for decreasing amounts of poisonous gases exhausted from the associated engine during a long service.

While the invention has been illustrated and described in conjunction with a few preferred embodiments thereof it is to be understood that numerous change in the details of construction and the arrangement and combination of parts may be resorted to without departing from the spirit and scope of the invention. For example, instead of two sets of breaker's contacts disposed within a single housing to be open at different times, an electric generator may be used to be rotated in synchronization with the rotation of the associated engine for the purpose of making the device contactless. Also the electronic ignition circuit 200 may be of the discharge-of-capacitor type rather than of the current interruption type. Further the switching transistor 102 may be replaced by any suitable gate controlled switch or the like. This is true in the case of the transistors 202 and 216.

In addition, many other statuses of the engine may be sensed by individual status sensor elements operatively associated to the corresponding portions of the engine thereby to supply control signals to the transistor 102. Then the control signals are separately used to decrease amounts of exhausted poisonous gases from the engine by means of any suitable process different from that described in conjunction with the illustrated embodiments of the invention.

What is claimed is:

1. A device for controlling the ignition timing of an internal combustion engine comprising, in combination, a plurality of status sensor elements connected during use of the device with the engine to sense predetermined operating statuses of the engine and accordingly produce status signals, a source of electrical energy, a control circuit connecting said plurality of said status sensor elements in parallel circuit relationship to said source and including a semiconductor switching element common to all said status sensor elements operative to develop the same output control signal in response to each of said status signals, an ignition coil, and an ignition circuit connected to said ignition coil energized by said source and responsive to said output control signal from said semiconductor switching element to control the energization of said ignition coil to accordingly control the ignition timing of the engine.

2. A device for controlling the ignition timing of an internal combustion engine as claimed in claim 1 wherein each of said status sensor elements includes means including a movable contact for short-circuiting its own status signal to prevent it from being applied to said semiconductor switching element when said movable contact is in one position and permitting the status signal to be applied to said semiconductor switching element when said movable contact is in another position.

3. A device for controlling the ignition timing of an internal combustion engine as claimed in claim 1 wherein predetermined ones of said status sensor elements each have a semiconductor diode branched from an energization circuit therefor and disposed in a circuit for energizing said semiconductor switching element and having a polarity effective to permit said semiconductor switching element to be energized by said source through said diode.

4. A device for controlling the ignition timing of an internal combustion engine as claimed in claim 1, further comprising a plurality of sets of breaker contacts connected in parallel circuit relationship with one another and each connected in series with said ignition coil and said sets of contacts having different ignition timing cycles from each other, and relay means energized in response to the operation of said semiconductor switching element to render effective that set of contacts lagging in ignition timing.

5. A device for controlling the ignition timing of an internal combustion engine as claimed in claim 1 wherein said plurality of status sensor elements are operative in response to a predetermined degree of depression of an acceleration pedal for the engine, an starting electric motor for the engine, a predetermined position of a transmission gearing and a negative pressure in a suction pipe for the engine respectively.

6. A device for controlling the ignition timing of an internal combustion engine as claimed in claim 1 wherein said ignition circuit includes at least a first semiconductor switching element operative in response to the output signal from said semiconductor switching element of said control circuit to produce an output signal, and a second semiconductor switching element operative in response to the output signal from said first semiconductor switching element to control the energization of said ignition coil thereby to generate an ignition voltage across said ignition coil.

7. A device for controlling the ignition timing of an internal combustion engine as claimed in claim 1 wherein said ignition circuit includes a first semiconductor switching element operative in response to the output signal from said semiconductor switching element of said control circuit to produce an output signal, a second semiconductor switching element operative in response to the output signal from said first semiconductor switching element to control the energization of said ignition coil thereby to generate an ignition voltage across said ignition coil, a first set of breaker contacts short circuited when said semiconductor switching element of said control circuit is in its conducting state and operative when the latter is in its non-conducting state to apply an input signal to said first semiconductor switching element, and a second set of breaker contacts operative when said semiconductor switching element of said control circuit is in its conducting state to apply an input signal to said first semiconductor switching element, said second set of breaker contacts having an ignition timing cycle later than that of said first set of breaker contacts.

8. A device for controlling the ignition timing of an internal combustion engine as claimed in claim 1 wherein said ignition circuit includes a first semiconductor switching element operative in response to the output signal from said semiconductor switching element of said control circuit to produce an output signal, a second semiconductor switching element operative in response to the output signal from said first semiconductor switching element to control the energization of said ignition coil thereby to generate an ignition voltage across said ignition coil, a first set of breaker contacts short circuited when said semiconductor switching element of said control circuit is in its conducting state and operative when the latter is in its non-conducting state to apply an input signal to said first semiconductor switching element, a second set of breaker contacts operative when said semiconductor switching element of said control circuit is in its conducting state to apply an input signal to said first semiconductor switching element, said second set of breaker contacts having an ignition timing cycle later than that of said first set of breaker contacts, and a pair of first and second semiconductor diodes disposed in parallel circuit relationship with said first and second sets of breaker contacts and in a circuit for energizing said first semiconductor switching element in the forward direction with respect thereto.

9. In an internal combustion engine having an ignition coil and a source of electrical energy: electric circuit means connecting said ignition coil to said source and including means operable during operation of the internal combustion engine for alternatively effecting energization of said ignition coil in one timing mode in response to an electric control signal and in another timing mode during the absence of the electric control signal; sensing means for individually sensing a plurality of different internal combustion engine operating conditions and providing a plurality of corresponding electric output signals; and control circuit means connected to both said electric circuit means and sensing means receptive of said plurality of electric output signals for developing an electric control signal in response to receiving any one of said plurality of electric output signals and applying same to said electric circuit means to effect energization of the ignition coil in said one timing mode.

10. An internal combustion engine according to claim 9; wherein said control circuit means includes a semiconductor switching element normally in a first switching state and operative when switched from said first switching state to a second switching state to develop said electric control signal and having an input side connected to said sensing means to receive therefrom said electric output signals and an output side connected to said electric circuit means whereby individual ones of said electric output signals effect switching of said semiconductor switching element from said first switching state to said second switching state to apply said electric control signal to said electric circuit means.

11. An internal combustion engine according to claim 10; wherein said sensing means comprises a plurality of sensor elements each connected in parallel with said source and each connected to said input side of said semiconductor switching element.

12. An internal combustion engine according to claim 10; wherein said electric circuit means includes a first set of breaker contacts alternately opened and closed during operation of the internal combustion engine defining said one timing mode, a second set of breaker contacts alternately opened and closed in a different timing cycle than said first set defining said another timing mode, and means electrically connecting said second set of breaker contacts to said ignition coil during the absence of said electric control signal and electrically connecting said first set of breaker contacts to said ignition coil in response to said electric control signal.

13. An internal combustion engine according to claim 12; wherein said last-mentioned means includes a relay normally positioned to connect said second set of breaker contacts to said ignition coil and disconnect said first set of breaker contacts from said ignition coil and movable in response to said electric control signal to a position connecting said first set of breaker contacts to said ignition coil and disconnecting said second set of breaker contacts from said ignition coil.

14. An internal combustion engine according to claim 12; wherein said last-mentioned means includes a first semiconductor switching device having an input side connected to said output side of said semiconductor switching element and an output side and responsive to said electric control signal applied to its input side for developing an output signal at its output side, a second semiconductor switching device having an input side connected to said output side of said first semiconductor switching device and an output side and responsive to said output signal applied to its input side for developing an output signal at its output side, and means electrically connecting said second set of breaker contacts to said ignition coil during the absence of said output signal from said output side of said second semi-conductor switching device and electrically connecting said first set of breaker contacts to said ignition coil in response to said output signal.

* * * * *